US012606032B2

(12) United States Patent
Takaki et al.

(10) Patent No.: US 12,606,032 B2
(45) Date of Patent: Apr. 21, 2026

(54) WORK VEHICLE, AND CONTROL DEVICE AND CONTROL METHOD FOR WORK VEHICLE

(71) Applicant: Kubota Corporation, Osaka (JP)

(72) Inventors: Takahiro Takaki, Sakai (JP); Yosuke Hayashi, Sakai (JP); Yuki Minamide, Sakai (JP); Kenichi Iwami, Sakai (JP); Tomoyoshi Sakano, Sakai (JP); Go Takaki, Sakai (JP); Kodai Amitani, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/983,600

(22) Filed: Dec. 17, 2024

(65) Prior Publication Data

US 2025/0115141 A1    Apr. 10, 2025

Related U.S. Application Data

(63) Continuation of application No. PCT/JP2023/023487, filed on Jun. 26, 2023.

(30) Foreign Application Priority Data

Jun. 28, 2022    (JP) ................................. 2022-103772

(51) Int. Cl.
*B60L 50/70* (2019.01)
*B60L 1/00* (2006.01)
(Continued)

(52) U.S. Cl.
CPC ................. *B60L 50/70* (2019.02); *B60L 1/00* (2013.01); *B60L 15/20* (2013.01); *B60L 58/12* (2019.02);
(Continued)

(58) Field of Classification Search
CPC .......... B60L 50/70; B60L 58/12; B60L 58/30; B60L 1/00; B60L 15/20
See application file for complete search history.

(56) References Cited

U.S. PATENT DOCUMENTS

| | | | |
|---|---|---|---|
| 2007/0179636 A1 | 8/2007 | Shige | |
| 2020/0231066 A1 | 7/2020 | Kong et al. | |

(Continued)

FOREIGN PATENT DOCUMENTS

| | | |
|---|---|---|
| JP | 2002225577 A | 8/2002 |
| JP | 2003136970 A | 5/2003 |

(Continued)

OTHER PUBLICATIONS

International Search Report in PCT/JP2023/023487, mailed Aug. 29, 2023, 2 pages.

*Primary Examiner* — Faye M Fleming
(74) *Attorney, Agent, or Firm* — Keating & Bennett, LLP

(57) ABSTRACT

A work vehicle includes a fuel cell module including a fuel cell stack, at least one fuel tank to store fuel to be supplied to the fuel cell stack, a motor connected to the fuel cell module, a power take-off shaft drivable by the motor and to which an implement is connectable, and a controller configured or programmed to be operable in various control modes including a normal mode and an output limitation mode in which an upper limit value of electric power supplied from the fuel cell module to the motor is smaller than in the normal mode. In the output limitation mode, the controller is configured or programmed to alter the upper limit value of the electric power supplied to the motor according to at least one of a type of the implement connected to the power take-off shaft and a type of work performed by the implement.

12 Claims, 11 Drawing Sheets

(51) Int. Cl.
   B60L 15/20          (2006.01)
   B60L 58/12          (2019.01)
   B60L 58/30          (2019.01)

(52) U.S. Cl.
   CPC ........... B60L 58/30 (2019.02); *B60L 2200/40*
              (2013.01); *B60L 2240/42* (2013.01); *B60L*
                 *2240/525* (2013.01); *B60L 2240/545*
                 (2013.01); *B60L 2260/40* (2013.01)

(56)                    References Cited

U.S. PATENT DOCUMENTS

| | | | |
|---|---|---|---|
| 2021/0094420 A1 | 4/2021 | Sosnowski et al. | |
| 2021/0135255 A1* | 5/2021 | Sawada | ................... B60L 58/34 |
| 2021/0170912 A1 | 6/2021 | Kawase et al. | |
| 2023/0019714 A1* | 1/2023 | Takaki | ...................... F17C 1/04 |

FOREIGN PATENT DOCUMENTS

| | | |
|---|---|---|
| JP | 2005304179 A | 10/2005 |
| JP | 2019118192 A | 7/2019 |
| JP | 2019170022 A | 10/2019 |
| JP | 2020162282 A | 10/2020 |
| JP | 2020533749 A | 11/2020 |
| JP | 2021090324 A | 6/2021 |

* cited by examiner

*FIG. 7A*

| IMPLEMENT TYPE | UPPER LIMIT OF MOTOR INPUT POWER (kW) |
|---|---|
| ROTARY TILLER | P1 |
| SPREADER | P2 |
| SEEDER | P3 |
| MOWER | P4 |
| HARROW | P5 |

*FIG. 7B*

| IMPLEMENT TYPE | WORK TYPE | UPPER LIMIT OF MOTOR INPUT POWER (kW) |
|---|---|---|
| ROTARY TILLER | TILLING | P11 |
| ROTARY TILLER | PUDDLING | P12 |
| ROTARY TILLER | RIDGING | P13 |
| SPREADER | FERTILIZING | P21 |
| SEEDER | SEEDING | P31 |
| MOWER | MOWING | P41 |
| HARROW | HARROWING | P51 |
| HARROW | PUDDLING | P52 |

*FIG.7C*

| IMPLEMENT TYPE | WORK TYPE | UPPER LIMIT OF MOTOR INPUT POWER (kW) |
|---|---|---|
| ROTARY TILLER | TILLING (HIGH-LOAD) | P111 |
| ROTARY TILLER | TILLING (MEDIUM-LOAD) | P112 |
| ROTARY TILLER | TILLING (LOW-LOAD) | P113 |
| ROTARY TILLER | PUDDLING | P12 |
| ROTARY TILLER | RIDGING | P13 |
| SPREADER | FERTILIZING | P21 |
| SEEDER | SEEDING | P31 |
| MOWER | MOWING | P41 |
| HARROW | HARROWING | P51 |
| HARROW | PUDDLING | P52 |

WORK VEHICLE, AND CONTROL DEVICE AND CONTROL METHOD FOR WORK VEHICLE

CROSS REFERENCE TO RELATED APPLICATIONS

This application claims the benefit of priority to Japanese Patent Application No. 2022-103772 filed on Jun. 28, 2022 and is a Continuation Application of PCT Application No. PCT/JP2023/023487 filed on Jun. 26, 2023. The entire contents of each application are hereby incorporated herein by reference.

BACKGROUND OF THE INVENTION

1. Field of the Invention

The present disclosure relates to work vehicles, and controllers and control methods for work vehicles.

2. Description of the Related Art

In the field of motor vehicles, where the main purpose is to transport "people" or "objects," electric vehicles (EVs) are becoming increasingly popular. In these vehicles, the driving force (traction) is generated by an electric motor (hereinafter referred to as "motor") instead of an internal combustion engine.

On the other hand, there is a need to reduce the amount of carbon dioxide ($CO_2$) emitted by work vehicles, such as tractors used in agricultural fields, to realize a decarbonized society. Unlike typical automobiles, work vehicles such as tractors need to tow implements, which are work machines, to perform agricultural tasks such as plowing. Therefore, to achieve the electrification of work vehicles, there are issues to be solved that differ from those of passenger cars.

Japanese Laid-Open Patent Publication No. 2003-136970 discloses a work vehicle equipped with a fuel cell (FC) and drivable by electric power generated by the fuel cell.

SUMMARY OF THE INVENTION

In a work vehicle equipped with a fuel cell module, there may be situations in which it is necessary to suppress the output of the motor, such as when the remaining fuel amount is low, or when the fuel cell module or motor is hot.

Example embodiments of the present disclosure provide example embodiments and techniques to appropriately limit the motor output in situations where it is necessary to suppress the motor output.

A work vehicle according to the present disclosure, in an exemplary and non-limiting example embodiment, includes a fuel cell module including a fuel cell stack, at least one fuel tank to store fuel to be supplied to the fuel cell stack, a motor connected to the fuel cell module, a power take-off shaft drivable by the motor and configured to connect to an implement, a controller configured or programmed to control electric power supplied from the fuel cell module to the motor. The controller is configured or programmed to be operable in a plurality of control modes including a normal mode and an output limitation mode in which an upper limit value of the electric power supplied from the fuel cell module to the motor is smaller than in the normal mode. The controller is configured or programmed to alter the upper limit value of the electric power supplied to the motor according to a type of the implement connected to the power take-off shaft and/or a type of work performed by the implement.

Example embodiments of the present disclosure may be implemented using apparatuses, systems, methods, integrated circuits, computer programs, or non-transitory computer-readable storage media, or any combination thereof. The computer-readable storage media may be inclusive of volatile storage media or non-volatile storage media. The apparatuses may include multiple devices. In the case where the apparatuses include two or more devices, the two or more devices may be provided within a single piece of equipment or may be separately provided in two or more pieces of equipment.

According to example embodiments of the present disclosure, in situations where motor output suppression is required, motor output can be appropriately limited according to the type of implement and/or the type of work.

The above and other elements, features, steps, characteristics and advantages of the present invention will become more apparent from the following detailed description of the example embodiments with reference to the attached drawings.

BRIEF DESCRIPTION OF THE DRAWINGS

FIG. 7A is a diagram showing an example of a table indicating the relationship between types of implements and upper limit values of electric power supplied to the motor.

FIG. 7B is a diagram showing an example of a table indicating the relationship between types of implements, types of work, and upper limit values of electric power supplied to the motor.

FIG. 7C is a diagram showing another example of a table indicating the relationship between types of implements, types of work, and upper limit values of electric power supplied to the motor.

DETAILED DESCRIPTION OF THE EXAMPLE EMBODIMENTS

Figure 1:
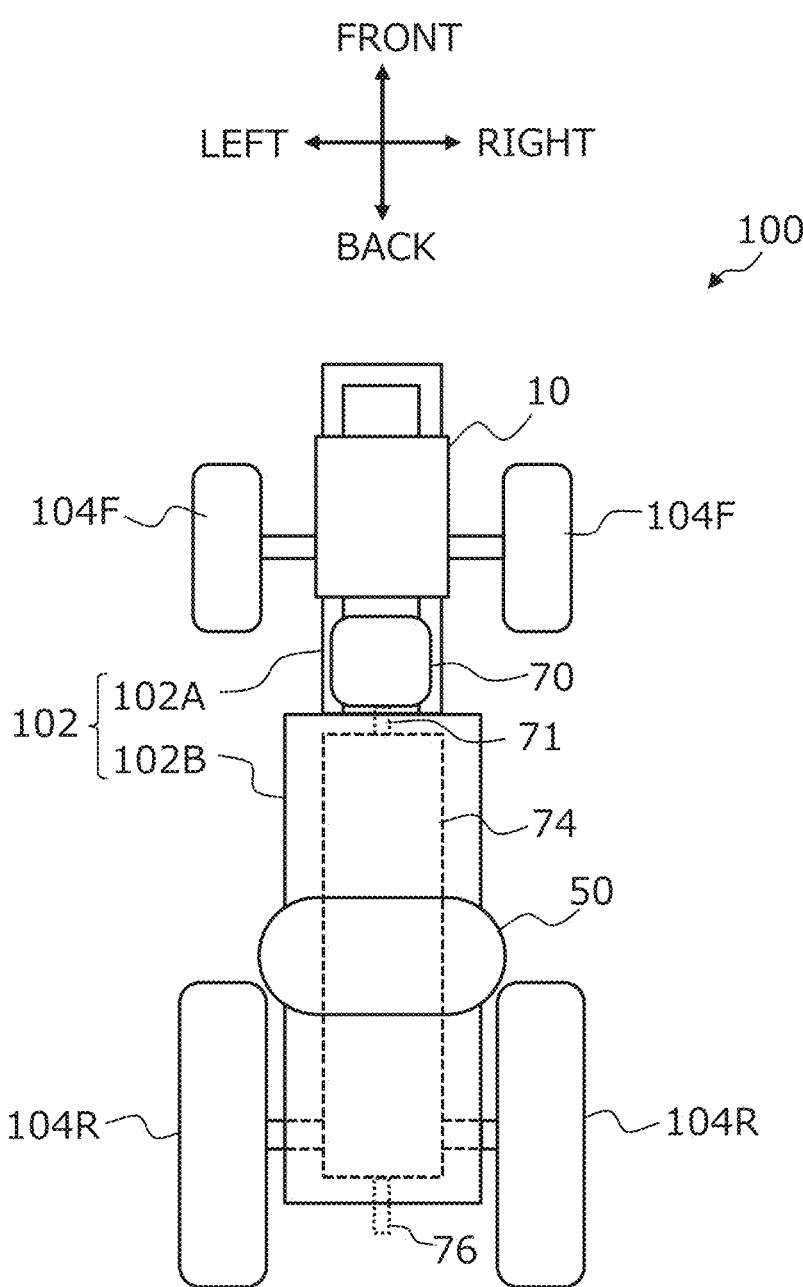
FIG. 1 is a plan view schematically showing a basic configuration example of a work vehicle according to the present disclosure.

The following describes example embodiments of the present disclosure. However, excessively detailed explanations may be omitted. For example, detailed explanations of well-known matters and repetitive explanations of substantially identical configurations may be omitted. This is to avoid the following description from becoming unnecessarily redundant and to facilitate understanding by those skilled in the art. The inventors provide the attached drawings and the following description to enable those skilled in the art to fully understand this disclosure, and do not intend to limit the subject matter described in the claims by these drawing and description. In the following description, the same reference numerals are used for components with the same or similar functions.

The following example embodiments are illustrative and not limiting. The technologies disclosed herein are not restricted to the following example embodiments. For instance, the numerical values, shapes, materials, steps, the order of those steps, screen layouts, and other elements shown in the following example embodiments are merely examples. Various modifications can be made as long as no technical contradictions arise. Additionally, different feature, elements, characteristics, etc., of the example embodiments may be combined as long as there are no technical contradictions.

In this disclosure, the term "work vehicle" refers to a vehicle used to perform a task at a work site. A "work site" includes any place where work is carried out, such as a field, forest, or construction site. A "field" refers to any place where agricultural work is performed, such as an orchard, farm, paddy field, grain farm, or pasture. A work vehicle may include an agricultural machine such as a tractor, rice planter, combine harvester, vehicle for crop management, or riding mower, as well as a non-agricultural vehicle such as a construction work vehicle or snowplow. The work vehicles described in this disclosure may be equipped with an implement (also called a "work machine" or "work device") attached to at least one of its front and rear portions, depending on the nature of the work. Travel of a work vehicle while performing a task may be referred to as "tasked travel."

An "agricultural machine" refers to a machine for agricultural application. Examples of agricultural machines include tractors, harvesters, rice planters, vehicles for crop management, vegetable transplanters, mowers, seeders, spreaders, and agricultural mobile robots. Not only may a work vehicle such as a tractor function as an "agricultural machine" on its own, but also the entire combination of a work vehicle and an implement attached to or towed by the work vehicle may function as an "agricultural machine." An agricultural machine performs agricultural work on the ground in a field, such as tilling, seeding, pest control, fertilizing, planting crops, or harvesting.

An example of the basic configuration and operation of the work vehicle according to this disclosure will be described. The work vehicle described below includes a motor and a fuel cell power generation system (hereinafter referred to as "FC power generation system") that generates the power necessary to drive the motor.

FIG. 1 is a schematic plan view showing an example of the basic configuration of a work vehicle 100 according to the present disclosure. In this disclosure, the direction in which the work vehicle 100 travels straight forward is referred to as the "forward direction," and the direction in which it travels straight backward is referred to as the "backward direction." In a plane parallel to the ground, the direction extending perpendicularly to the right of the "forward direction" is referred to as the "right direction," and the direction extending perpendicularly to the left is referred to as the "left direction." In FIG. 1, the "forward direction," "backward direction," "right direction," and "left direction" are indicated by arrows labeled "front," "back," "right," and "left" respectively. Both the forward and backward directions may be collectively referred to as the "front-back direction".

The work vehicle 100 illustrated in this example is, for instance, a tractor, which defines and functions as an example of agricultural machinery. The example embodiments and technologies disclosed herein are not limited to work vehicles such as tractors and may be applied to other types of work vehicles. The work vehicle 100 is configured to attach or tow an implement and travel within a field while performing agricultural tasks appropriate to the type of implement. Additionally, the work vehicle 100 is configured to travel both within and outside the field (including on roads) with the implement raised or without an implement attached.

The work vehicle 100, like a conventional tractor, includes a vehicle frame 102 that rotatably supports left and right front wheels 104F and left and right rear wheels 104R. The vehicle frame 102 includes a front frame 102A, where the front wheels 104F are mounted, and a transmission case 102B, where the rear wheels 104R are mounted. The front frame 102A is fixed to the front portion of the transmission case 102B. The front wheels 104F and rear wheels 104R may be collectively referred to as wheels 104. Strictly speaking, the wheels 104 refer to wheel rims with tires attached. In this disclosure, the term "wheel" generally refers to the entire assembly of the "wheel rim and tire." Either or both of the front wheels 104F and rear wheels 104R may be replaced with a plurality of wheels fitted with endless tracks (crawlers) instead of wheeled tires.

In the example shown in FIG. 1, the work vehicle 100 includes a fuel cell module (FC module) 10 and a motor 70, which are directly or indirectly supported by the front frame 102A. The FC module 10 includes a fuel cell stack (FC stack) and functions as an onboard power generator that generates electricity from fuel, as will be described later. Hereinafter, the terms "FC module" or "FC stack" may simply be referred to as "fuel cell."

The motor 70 is electrically connected to the FC module 10. The motor 70 converts the electric power generated by the FC module 10 into mechanical motion (power) to produce the driving force (traction) necessary for the work vehicle 100 to travel. An example of the motor 70 is an AC synchronous motor. Since the FC stack of the FC module 10 generates direct current, when the motor 70 is an AC synchronous motor, a group of electrical circuits, including an inverter, is installed between the FC stack and the motor 70 to convert the direct current to alternating current. A portion of such electrical circuit group may be inside the FC module 10, while another portion of the electrical circuit group may be attached to the motor 70 as a motor drive circuit.

The motor 70 includes an output shaft 71 that rotates. The torque of the output shaft 71 is transmitted to the rear wheels 104R through mechanical parts such as a transmission (gearbox) and a rear wheel differential gear device installed inside the transmission case 102B. In other words, the power generated by the motor 70, which serves as the power source, is transmitted to the rear wheels 104R through a power transmission system (drivetrain) 74 including the transmission installed in the transmission case 102B. For this reason, the "transmission case" may also be referred to as a "mission case." In four-wheel drive mode, a portion of the power of the motor 70 is also transmitted to the front wheels 104F. The power of the motor 70 may be used not only to drive the work vehicle 100 but also to operate implements. Specifically, a power take-off (PTO) shaft 76 is provided at the rear end of the transmission case 102B. The PTO shaft 76 is drivable by the motor 70 and is configured to be connected to an implement. The torque from the output shaft 71 of the motor 70 is transmitted to the PTO shaft 76. Implements attached to or towed by the work vehicle 100 is configured to receive power from the PTO shaft 76 to perform various work-related operations. The motor 70 and the power transmission system 74 may collectively be referred to as an electric powertrain.

Thus, the work vehicle 100 disclosed herein does not includes an internal combustion engine such as a diesel engine, but includes the FC module 10 and the motor 70. Additionally, the output shaft 71 of the motor 70 is mechanically coupled to the power transmission system 74, including the transmission in the transmission case 102B. The motor 70 efficiently generates torque over a relatively wide range of rotational speeds compared to an internal combustion engine. However, by utilizing the power transmission system 74, including the transmission, it becomes easier to adjust the torque and rotational speed from the motor 70 over an even wider range by performing multi-stage or continuously variable speed change operations. This configuration allows for efficient execution of not only the travel of the work vehicle 100 but also various operations using implements.

Depending on the application or size of the work vehicle 100, some functions of the power transmission system 74 may be omitted. For example, a portion or an entirety of the transmission responsible for speed change functions may be omitted. The number and mounting position of motors 70 are also not limited to the example shown in FIG. 1.

The work vehicle 100 includes at least one fuel tank 50 that stores fuel to be supplied to the FC module 10. For simplicity, FIG. 1 shows one fuel tank 50. In some example embodiments, a plurality of fuel tanks 50 may be housed in a tank case to define a fuel tank module. The fuel tank 50 is supported by structural elements fixed to the vehicle frame 102A described later. The FC module 10 and the fuel tank 50 are connected by piping and open/close valves, and similar components, defining an FC power generation system mounted on a vehicle. The configuration and operation of the FC power generation system will be described later.

The work vehicle 100 in the example embodiments described later includes a seat for a driver, hereinafter referred to as "a driver seat," supported by the vehicle frame 102. The driver seat may be enclosed by a cabin supported by the vehicle frame 102. In the example embodiments described later, the FC module 10 is positioned in front of the driver seat, and the fuel tank 50 is positioned above the driver seat. Such FC module 10 and fuel tank 50 are housed in at least one "enclosure." The "enclosure" functions as a housing, for example, and plays a role in protecting the FC module 10 and fuel tank 50 from sunlight exposure and wind and rain. Additionally, such an enclosure is designed to control the spread of fuel gas into the atmosphere and to facilitate the detection of fuel gas when fuel gas leaks from the FC module 10 or fuel tank 50.

The FC module 10 may be housed in a front housing called a "bonnet," for example. The front housing is a portion of the "enclosure." The front housing is supported by the front portion of the vehicle frame 102 (front frame 102A). The fuel tank 50 is housed in a tank case, as mentioned earlier. The tank case is directly or indirectly supported by the vehicle frame 102.

Next, referring to FIG. 2, a basic configuration example of the FC power generation system 180 mounted on the work vehicle 100 will be explained.

Figure 2:
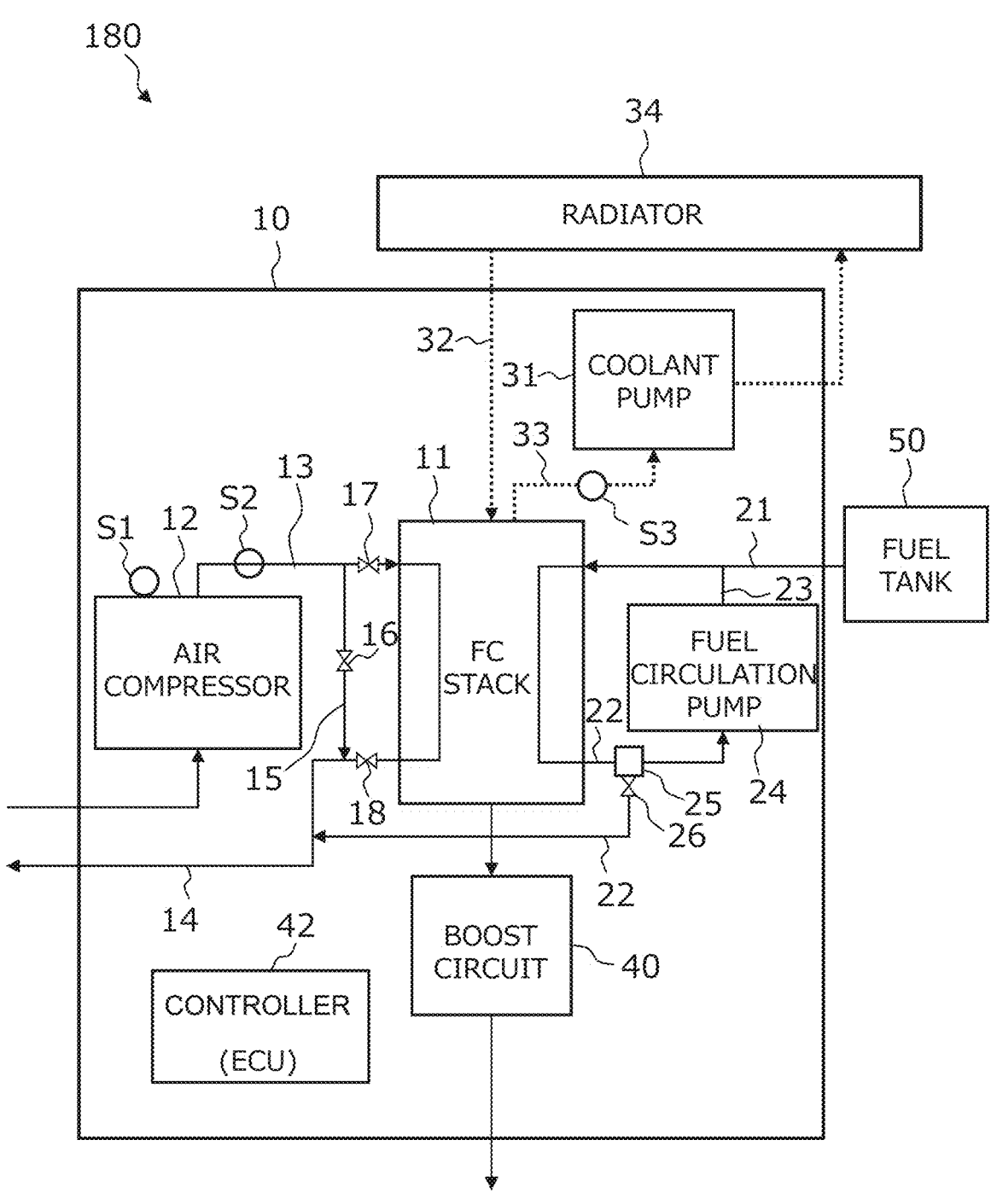
FIG. 2 is a diagram showing a basic configuration example of a fuel cell power generation system mounted on the work vehicle.

The FC power generation system 180 shown in FIG. 2 functions as an onboard power generation system in the work vehicle 100 of FIG. 1. The electric power generated by the FC power generation system 180 is used not only for the travel of the work vehicle 100 but also for the operation of implements towed or attached to the work vehicle 100.

The FC power generation system 180 in the illustrated example includes the FC module 10 and at least one fuel tank 50 that stores fuel to be supplied to the FC module 10. The FC power generation system 180 also includes a radiator device 34 to cool the FC module 10.

The FC module 10 includes main components such as a fuel cell stack (FC stack) 11, an air compressor 12, a fuel circulation pump 24, a coolant pump 31, a boost circuit 40, and a controller 42. These components are housed within the casing of the FC module 10 and are connected to each other through electrical or fluid communication.

The FC stack 11 generates electric power through an electrochemical reaction between the fuel, referred to as "anode gas", and the oxidizing gas, referred to as "cathode gas." In this example, the FC stack 11 includes polymer electrolyte fuel cells. The FC stack 11 has a stack structure in which a plurality of single cells (fuel cell elements) are stacked. A single cell includes, for example, an electrolyte membrane including an ion exchange membrane, an anode electrode on one side of the electrolyte membrane, a cathode electrode on the other side of the electrolyte membrane, and a pair of separators sandwiching the anode electrode and cathode electrode on both sides. The voltage generated in a single cell is, for example, less than 1 volt. Therefore, in the FC stack 11, for instance, more than 300 single cells are connected in series to generate a voltage of several hundred volts.

Anode gas is supplied to the anode electrode of the FC stack 11. The anode gas is called "fuel gas" or simply "fuel." In the example embodiments of this disclosure, the anode gas (fuel) is hydrogen gas. Cathode gas is supplied to the cathode electrode. The cathode gas is an oxidizing gas such as air. The anode electrode is called the fuel electrode, and the cathode electrode is called the air electrode.

At the anode electrode, the electrochemical reaction shown in the following equation (1) occurs.

$$2H_2 \rightarrow 4H^+ + 4e^- \qquad \text{equation (1)}$$

At the cathode electrode, the electrochemical reaction shown in the following equation (2) occurs.

$$4H^+ + 4e^- + O_2 \rightarrow 2H_2O \qquad \text{equation (2)}$$

Overall, the reaction shown in the following equation (3) occurs.

$$2H_2 + O_2 \rightarrow 2H_2O \qquad \text{equation (3)}$$

The anode gas after being used in the above reaction is called "anode off-gas", and the cathode gas after being used in the reaction is called "cathode off-gas."

The air compressor 12 supplies air taken from the outside as cathode gas to the cathode electrode of the FC stack 11. The cathode gas supply system including the air compressor 12 includes a cathode gas supply pipe 13, a cathode off-gas pipe 14, and a bypass pipe 15. The cathode gas supply pipe 13 flows cathode gas (air) supplied from the air compressor 12 to the cathode electrode of the FC stack 11. The cathode off-gas pipe 14 flows cathode off-gas discharged from the FC stack 11 to the outside air. The bypass pipe 15 branches from the cathode gas supply pipe 13 downstream of the air compressor 12, bypasses the FC stack 11, and connects to the cathode off-gas pipe 14. A control valve 16 is provided on the bypass pipe 15 to adjust the flow rate of cathode gas flowing through the bypass pipe 15. A shut-off valve 17 is provided on the cathode gas supply pipe 13 to selectively block the inflow of cathode gas to the FC stack 11. A pressure regulating valve 18 is provided on the cathode off-gas pipe 14 to adjust the back pressure of the cathode gas.

The cathode gas supply system of the FC module 10 includes a rotation speed detection sensor S1 that detects the rotation speed of the air compressor 12 and a gas flow rate detection sensor S2 that detects the flow rate of cathode gas flowing through the cathode gas supply pipe 13. The control valve 16, shut-off valve 17, and pressure regulating valve 18 are, for example, electromagnetic valves.

The fuel circulation pump 24 supplies fuel gas (anode gas) sent from the fuel tank 50 to the anode electrode of the FC stack 11. The anode gas supply system including the fuel circulation pump 24 includes an anode gas supply pipe 21, an anode off-gas pipe 22, and a circulation path 23. The anode gas supply pipe 21 flows anode gas supplied from the fuel tank 50 to the anode electrode of the FC stack 11. In the example embodiments of this disclosure, the fuel tank 50 is a hydrogen tank that stores high-pressure hydrogen gas.

The anode off-gas pipe 22 flows anode off-gas discharged from the FC stack 11. The anode off-gas is led through the anode off-gas pipe 22 to a gas-liquid separator 25 in which moisture is removed. The anode off-gas with moisture removed returns to the anode gas supply pipe 21 through the circulation path 23 by the fuel circulation pump 24. The anode off-gas circulating through the circulation path 23 can be discharged through the anode off-gas pipe 22 by opening an exhaust valve 26. Moisture accumulated in the gas-liquid separator 25 can be discharged through the anode off-gas pipe 22 by opening the exhaust valve 26. The exhaust valve 26 is, for example, an electromagnetic valve. In the example shown in the figure, the anode off-gas pipe 22 is connected to the cathode off-gas pipe 14. By adopting this configuration, it is possible to improve the utilization efficiency of the anode gas by circulating the anode off-gas containing unreacted anode gas that did not contribute to the electrochemical reaction and supplying it again to the FC stack 11.

To enhance the performance of the FC stack 11, temperature control is important. When generating electricity through the reaction of producing water from hydrogen gas and oxygen gas, heat is also generated, necessitating cooling. FIG. 2 shows a coolant circulation system including a coolant pump 31 for the FC stack 11, but as described later, cooling circulation systems for other electrical equipment may also be provided. Note that the air compressor 12, fuel circulation pump 24, and coolant pump 31 included in the FC module 10 are drivable by individual built-in motors. These motors are also electrical equipment.

The coolant circulation system including the coolant pump 31 shown in FIG. 2 includes a coolant supply pipe 32, a coolant discharge pipe 33, a radiator device 34, and a temperature sensor S3. This coolant circulation system is configured to adjust the temperature of the FC stack 11 within a predetermined range by circulating coolant through the FC stack 11. The coolant is supplied to the FC stack 11 through the coolant supply pipe 32. The supplied coolant flows through a coolant path between single cells and is discharged into the coolant discharge pipe 33. The coolant discharged into the coolant discharge pipe 33 flows to the radiator device 34. The radiator device 34 performs heat exchange between the incoming coolant and the outside air to release heat from the coolant, and then resupplies the cooled coolant to the coolant supply pipe 32.

The coolant pump 31 is provided on either the coolant supply pipe 32 or the coolant discharge pipe 33 to pump coolant to the FC stack 11. A coolant bypass flow path may be provided between the coolant discharge pipe 33 and the coolant supply pipe 32. In that case, a flow dividing valve is provided at the branching point at which the coolant bypass flow path branches from the coolant discharge pipe 33. The flow dividing valve is configured to adjust the flow rate of coolant flowing through the bypass flow path. The temperature sensor S3 detects the temperature of the coolant flowing through the coolant discharge pipe 33.

The coolant used to cool the FC stack 11 is circulated through the flow path by an electric coolant pump 31. A coolant control valve may be provided downstream of the FC stack 11. The coolant control valve adjusts the ratio of coolant flowing to the radiator device 34 and coolant bypassing the radiator device 34, enabling more accurate control of the coolant temperature. Furthermore, by controlling the liquid delivery amount by the coolant pump, it is also possible to control the coolant temperature difference between the inlet and outlet of the FC stack 11 to be within a desired range. The temperature of the coolant in the FC stack 11 may be controlled to be around 70° C., for example, which is a temperature where the power generation efficiency of the FC stack 11 is high.

The coolant flowing through the FC stack 11 preferably has higher insulation properties compared to the coolant used to cool ordinary electrical equipment. Since voltages exceeding 300 volts can occur in the FC stack 11, increasing the electrical resistance of the coolant allows for the suppression of current leakage through the coolant or devices such as the radiator device 34. The electrical resistance of the coolant may decrease as the coolant is used. This is because ions dissolve into the coolant flowing through the FC stack 11. To remove such ions from the coolant and increase insulation property, it is desirable to place an ion exchanger in the coolant flow path.

The boost circuit 40 is configured to increase the voltage output by the FC stack 11 through power generation to a desired level. The subsequent stage of the boost circuit 40 is connected to the high-voltage electrical circuit including an inverter for motor drive. Additionally, the subsequent stage of the boost circuit 40 may also be connected in parallel to the low-voltage electrical circuit via a step-down circuit.

The controller 42 may include an electronic control unit (ECU) configured or programmed to control power generation by the FC module 10. The controller 42 is configured or programmed to detect or estimates the operating state of the FC power generation system 180 based on signals output from various sensors. The controller 42 is configured or programmed to control power generation by the FC stack 11 by regulating the operation of the air compressor 12, fuel circulation pump 24, coolant pump 31, and various valves, based on the operating state of the FC power generation system 180 and instructions output from a higher-level computer or other ECUs. The controller 42 is configured or programmed to include, for example, a processor, a storage, and an input/output interface.

In the following description, for simplicity, "anode gas" may be referred to as "fuel gas" or "fuel," and "anode gas supply pipe" may be referred to as "piping."

Figure 3:
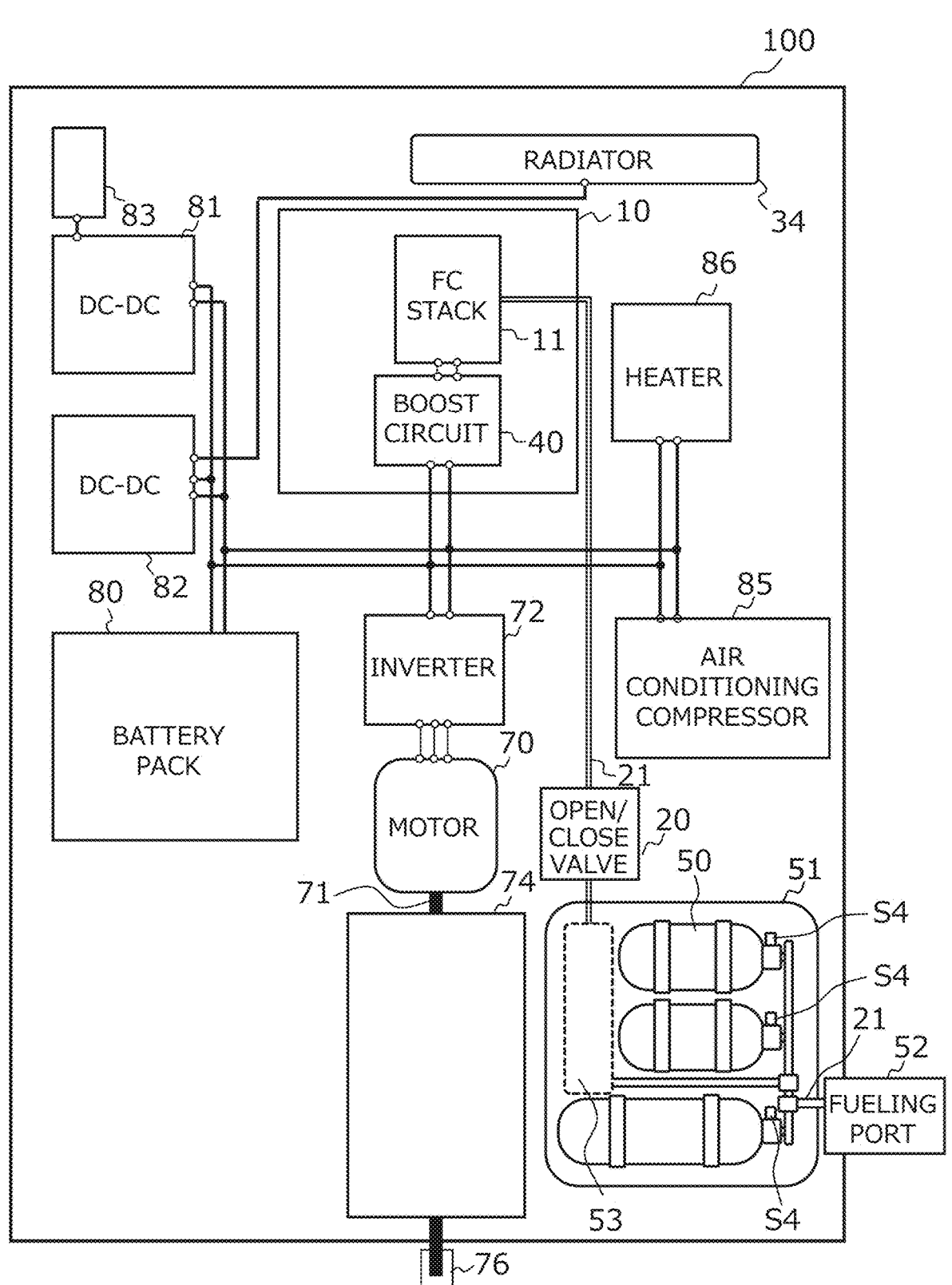
FIG. 3 is a block diagram schematically showing an example of electrical connections and power transmission between components of the work vehicle according to the present disclosure.
Figure 4:
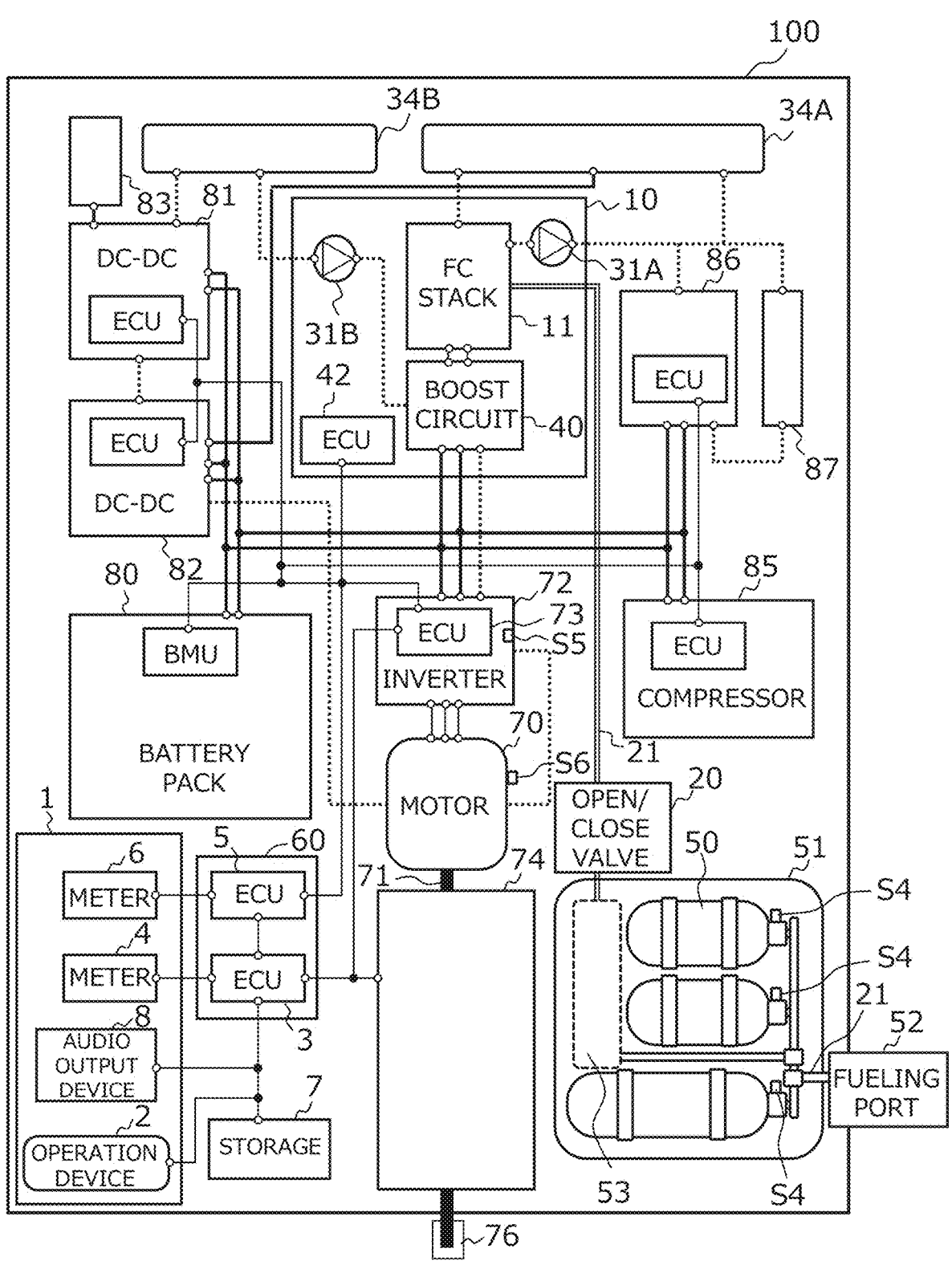
FIG. 4 is a block diagram schematically showing paths of electrical signals (solid thin lines) and coolant paths (dotted lines) between components of the work vehicle according to the present disclosure.

Next, referring to FIGS. 3 and 4, a configuration example of the system of the work vehicle 100 according to this disclosure will be described. FIG. 3 is a block diagram schematically showing an example of electrical connections and power transmission between components of the work vehicle 100 according to this disclosure. FIG. 4 is a block diagram showing a more detailed configuration than the example in FIG. 3. FIG. 4 schematically shows the paths of electrical signals (thin solid lines) and coolant (dotted lines) between components in the work vehicle 100.

First, referring to FIG. 3, an example of the electrical connections and power transmission between components will be described. Electrical connections include both high-voltage and low-voltage systems. High-voltage electrical connections provide, for example, the power supply voltage for inverters. Low-voltage electrical connections provide, for example, the power supply voltage for electronic components that operate at relatively low voltages.

In the example shown in FIG. 3, the work vehicle 100 includes an FC module 10, an inverter 72, a motor 70, a power transmission system 74, and a PTO shaft 76. The DC voltage of the power generated in the FC stack 11 of the FC module 10 is boosted by the boost circuit 40 and then supplied to the inverter 72. The inverter 72 converts the DC voltage into, for example, a three-phase AC voltage and supplies it to the motor 70. The inverter 72 includes a bridge circuit (hereinafter also referred to as an "inverter circuit") including a plurality of power transistors. The motor 70 includes a rotating rotor and a stator with a plurality of coils electrically connected to the inverter 72. The rotor is coupled to the output shaft 71, for example, via a reduction gear (speed reducer) or directly. The motor 70 rotates the output shaft 71 with torque and rotational speed controlled according to the waveform of the three-phase AC voltage from the inverter 72.

The inverter 72 shown in FIG. 4 includes an ECU 73 configured or programmed to control the motor 70. The ECU 73 is configured or programmed to control the switching operation (turn-on or turn-off) of each of the plurality of power transistors included in the bridge circuit of the inverter 72. The ECU 73 may be connected to the plurality of power transistors in the bridge circuit via pre-drivers (which may be referred to as "gate drivers"). The ECU 73 may be configured or programmed to operate under the control of a higher-level computer such as the controller 60.

The torque of the output shaft 71 of the motor 70 is transmitted to the power transmission system 74. The power transmission system 74 operates with the motor 70 as the power source to drive the wheels 104R and 104F, as shown in FIG. 1, and/or the PTO shaft 76. This power transmission system 74 may have the same or a similar structure as the power transmission system in conventional tractors including internal combustion engines such as diesel engines. By adopting a power transmission system used in agricultural tractors, for example, it is possible to reduce the design and manufacturing costs for producing an agricultural work vehicle 100 including an FC power generation system. The power transmission system 74 includes a travel power transmission mechanism that transmits power from the motor 70 to the left and right rear wheels 104R through a clutch, transmission, and rear wheel differential device, as well as a PTO power transmission mechanism that transmits power from the motor 70 to the PTO shaft 76. The transmission case 102B in FIG. 1 may be divided into a front case (mission case) housing the clutch and transmission and related components, and a rear case (differential gear case) housing the rear wheel differential device and related components. The rear case may also be referred to as a rear axle case.

The work vehicle 100 includes a secondary battery (battery pack) 80 that temporarily stores electrical energy generated by the FC module 10. An example of the battery pack 80 includes a pack of lithium-ion batteries. The battery pack 80 is configured to supply power to the inverter 72 at the necessary timing in cooperation with the FC module 10 or independently. Various battery packs used in electric passenger vehicles may be adopted as the battery pack 80.

The work vehicle 100 includes various electrical equipment (onboard electronic components) that operates on electricity, in addition to the motor 70 and the inverter 72. Examples of electrical equipment include electromagnetic valves such as open/close valves 20, air cooling fans of the radiator device 34, electric pumps of air conditioning compressors 85, and temperature controllers for heating or cooling the FC stack 11. The temperature controllers include electric heaters 86. A first and a second DC-DC converters 81 and 82 to obtain appropriate power supply voltages for the operation of electrical equipment, and storage batteries 83 may also be included in the electrical equipment. Furthermore, various electronic components not shown (such as lamps, electric motors for hydraulic systems) may be included in the electrical equipment. The electrical equipment may be electronic components similar to electrical equipment installed in conventional agricultural tractors.

In the example of FIG. 3, the first DC-DC converter 81 is a circuit that steps down the voltage output from the boost circuit 40 of the FC module 10 to a first voltage, for example, 12 volts. The storage battery 83 is, for example, a lead-acid battery and stores electrical energy at the voltage output from the first DC-DC converter 81. The storage battery 83 may be used as a power source for various electrical equipment such as lamps.

The work vehicle 100 shown in FIG. 3 includes not only the first DC-DC converter 81 but also a second DC-DC converter 82 as a voltage conversion circuit that steps down the high voltage output by the FC module 10. The second DC-DC converter 82 is a circuit that steps down the voltage output from the boost circuit 40 of the FC module 10 (for example, several hundred volts) to a second voltage higher than the first voltage, for example, 24 volts. The air cooling fan of the radiator device 34, for example, is configured to operate on the voltage output from the second DC-DC converter 82. Note that although the radiator device 34 is described as a single component in FIG. 3, one work vehicle 100 may include a plurality of radiator devices 34. Additionally, the electric pump of the air conditioning compressor 85 and the electric heater 86 are configured to operate on the voltage output from the second DC-DC converter 82.

The work vehicle 100 shown in FIG. 3 includes a temperature controller that cools or heats the FC stack 11 included in the FC power generation system. The operation of the temperature controller or alike requires relatively large power. The relatively high 24-volt voltage output by the second DC-DC converter 82 is applied to the temperature controller. In this example embodiment, the temperature controller includes the radiator device 34 that releases heat from the coolant cooling the FC stack 11, and the relatively high 24-volt voltage (second voltage) output by the second DC-DC converter 82 is applied to the radiator device 34. The temperature controller includes a heater 86 that heats the FC stack 11. The relatively high voltage output by the second DC-DC converter 82 may also be applied to the heater. The relatively high voltage output by the second DC-DC converter 82 may also be applied to air conditioning devices such as the air conditioning compressor 85.

The work vehicle 100 may include a third voltage conversion circuit that converts the high voltage output by the FC module 10 to a third voltage higher than the second voltage. The third voltage is, for example, 48 volts. If the work vehicle 100 includes another motor in addition to the motor 70, for example, the third voltage may be used as the power source for such other motors.

In an agricultural work vehicle including a fuel cell power generation system, in addition to the electrical equipment necessary for agricultural task, the agricultural work vehicle also includes electrical equipment necessary for the operation of fuel cell power generation, so the appropriate voltage magnitude may differ for each electrical equipment. According to the example embodiments of this disclosure, it is possible to supply voltages of appropriate magnitudes.

In the example shown in FIG. 3, a plurality of fuel tanks 50 are housed in a single tank case 51. The fuel tank 50 is connected to a supplying port (fueling port) 52 through which fuel is supplied from the outside. This connection is made via piping 21 for flowing fuel gas. The fuel tank 50 is also connected to the FC module 10 via piping 21, which is equipped with an open/close valve 20. When hydrogen is used as the fuel gas, the piping 21 may be formed from materials with high resistance to hydrogen embrittlement, such as austenitic stainless steel like SUS316L.

A valve space 53 is provided in the tank case 51, and various valves including a pressure reducing valve are placed in this valve space 53. Through various valves provided in the valve space 53, the piping 21 connects the fuel tank 50 and the FC module 10. Fuel gas with reduced pressure by the pressure reducing valve flows through the piping 21 connecting the tank case 51 and the FC module 10. When the fuel gas is hydrogen gas, high-pressure hydrogen gas of, for example, 35 megapascals or more may be filled in the fuel tank 50, but the hydrogen gas after passing through the pressure reducing valve may be reduced to about 2 atmospheres or less.

The fuel tank 50 includes a sensor S4 to measure the remaining amount of fuel in the fuel tank 50. Additionally, a temperature sensor may be provided to measure the temperature inside the fuel tank 50. Examples of sensor S4 include a pressure sensor that measures the pressure of the fuel corresponding to the remaining amount of fuel. The pressure sensor acquires remaining fuel pressure data indicating the pressure of the fuel remaining in the fuel tank 50.

Next, refer to FIG. 4. In addition to what is shown in FIG. 3, FIG. 4 shows a plurality of ECUs that communicate within the work vehicle 100 and a user interface 1. Communication can be executed via CAN bus wiring and other similar communication pathways, which function as paths for electrical signals (thin solid lines). FIG. 4 also shows a cooling system to perform thermal management of components. Specifically, the paths of coolant (dotted lines) are schematically shown.

As mentioned above, the first and second DC-DC converters 81 and 82 are configured to output voltages of different magnitudes. ECUs are also provided for these first and second DC-DC converters 81 and 82 to control each voltage conversion circuit. These ECUs, like other ECUs, are applied the relatively low first voltage output by the first DC-DC converter 81.

In the example of FIG. 4, the work vehicle 100 includes a cooling system in which coolant circulates via coolant pumps 31A and 31B. These coolant pumps 31A and 31B are provided inside the FC module 10. The cooling system in this example includes a first radiator device 34A responsible for cooling the FC stack 11 and a second radiator device 34B to cool other electrical equipment. The cooling system includes a flow path (first flow path) where coolant flows between the FC stack 11 and the first radiator device 34A. Furthermore, this cooling system has a flow path (second flow path) where coolant flows between electrical equipment including the motor 70 and the second radiator device 34B. In the example of FIG. 4, for instance, a heater core 87 used to heat the cabin is provided, and the coolant flowing through the first radiator device 34A flows through the heater core 87.

The user interface 1 includes operation devices 2 such as an accelerator pedal (or accelerator lever), an audio output device 8, a main meter 4, and an FC meter 6. The work vehicle 100 shown in FIG. 4 further includes a controller 60 and a storage 7. The controller 60 includes a main ECU 3 and an FC system ECU 5.

The main ECU 3 is connected to the FC system ECU 5, operation device 2, audio output device 8, main meter 4, and storage 7. The main ECU 3 controls the overall operation of the work vehicle 100. The main meter 4 may display various parameters that identify the travel state or operating state of the work vehicle 100. The FC system ECU 5 controls the operation of the FC power generation system. The FC system ECU 5 is connected to the FC meter 6. The FC meter 6 is configured to display various parameters that identify the operating state of the FC power generation system.

The storage 7 includes one or more storage media such as flash memory or magnetic disks. The storage 7 stores various data generated by the main ECU 3 and FC system ECU 5. The storage 7 also stores computer programs that cause the main ECU 3 and FC system ECU 5 to perform desired operations. The computer programs may be provided to the work vehicle 100 via storage media (e.g., semiconductor memory or optical discs) or telecommunication lines (e.g., the Internet). The computer programs may be sold as commercial software.

Examples of the audio output device 8 include buzzers or speakers. The audio output device 8 may be controlled by the main ECU 3. The audio output device 8 outputs sound or voice, for example, to prompt refueling.

The cells of the battery pack 80 are controlled by a Battery Management Unit (BMU). The BMU includes temperature sensors such as thermistors to measure battery cell temperature, voltage monitors for each battery cell, circuits and a CPU (Central Processing Unit) to perform monitoring of overcharging and over-discharging, and cell balance control. These circuits and CPU may be mounted on a battery controller board.

In the example shown in FIG. 4, the inverter 72 includes a temperature sensor S5. The temperature sensor S5 measures the temperature of the inverter 72. Additionally, a temperature sensor S6 is provided near the motor 70. The temperature sensor S6 measures the temperature of the motor 70.

Figure 5:
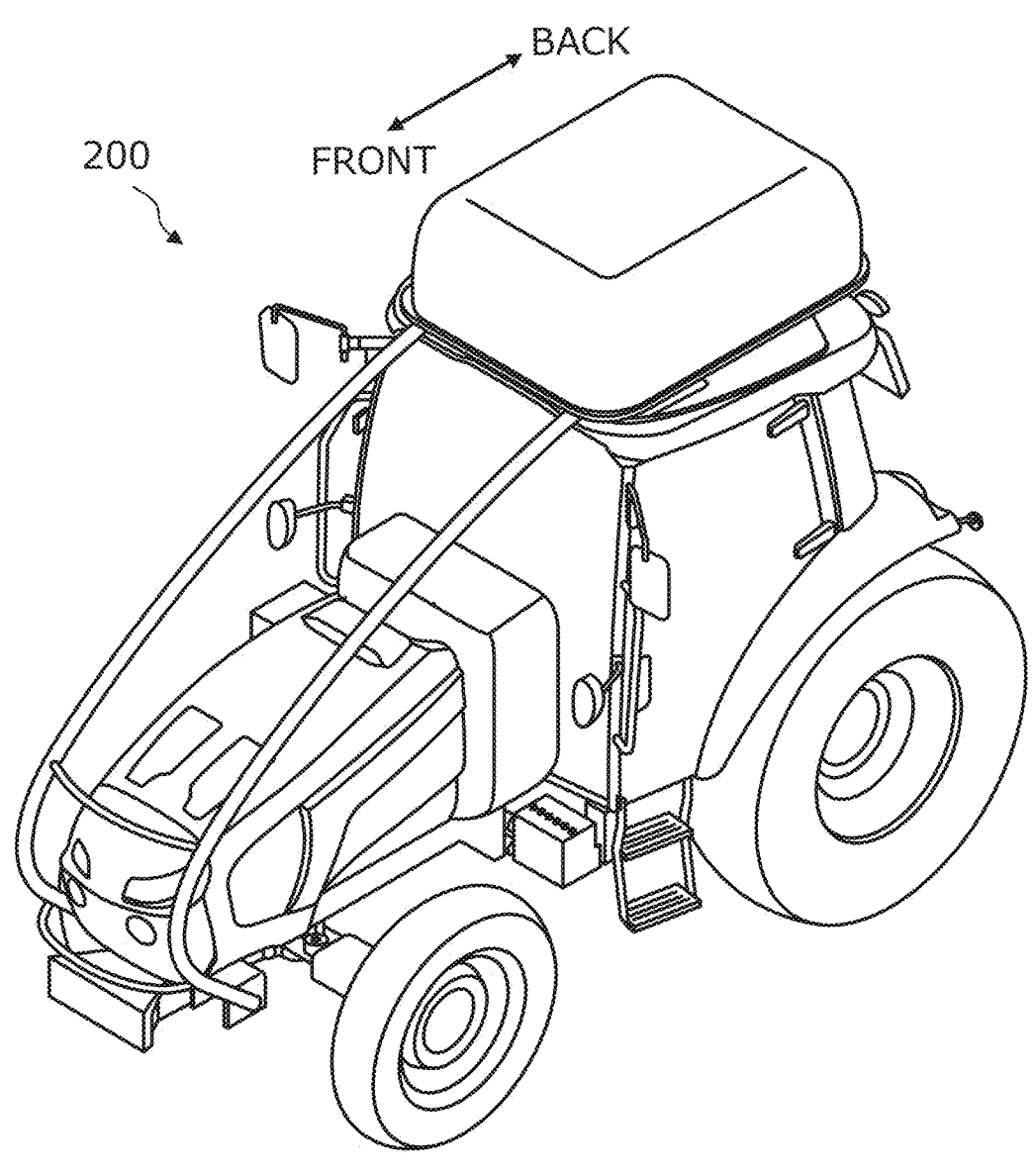
FIG. 5 is a perspective view schematically showing a configuration example of a work vehicle according to an example embodiment of the present disclosure.
Figure 6:
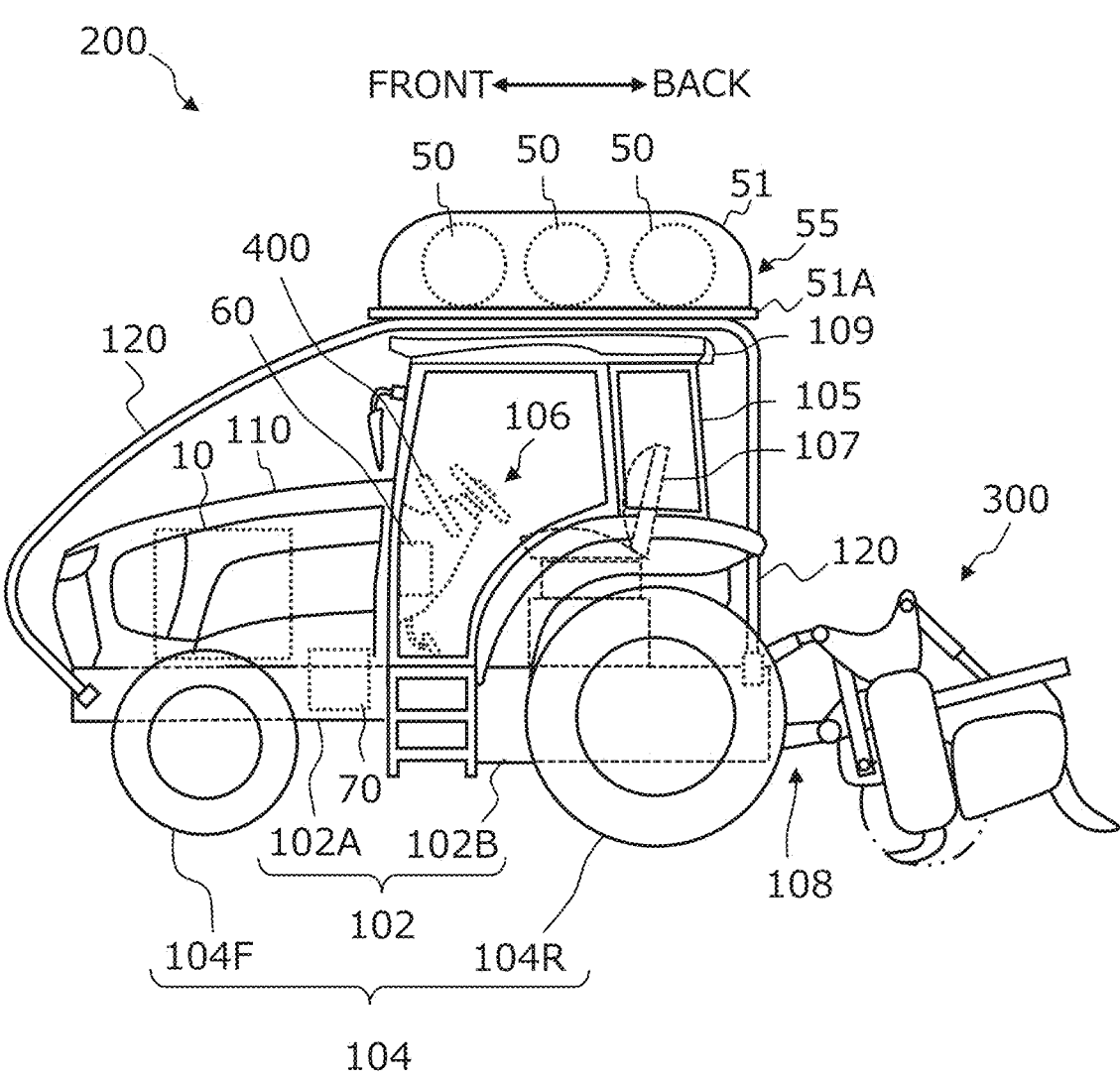
FIG. 6 is a side view schematically showing a configuration example of a work vehicle according to an example embodiment of the present disclosure.

Next, referring to FIGS. 5 and 6, the basic configuration of the work vehicle according to the example embodiments of this disclosure will be explained. FIG. 5 is a perspective view schematically showing a configuration example of the work vehicle 200 in this example embodiment. FIG. 6 is a side view schematically showing a configuration example of the work vehicle 200 in this example embodiment.

As shown in FIG. 6, the work vehicle 200 in this example embodiment includes an FC module 10, a fuel tank 50, a sensor S4 (refer to FIGS. 3 and 4), a motor 70, a driver seat 107, a controller 60, an operation terminal 400, and a vehicle frame 102. The work vehicle 200 has a configuration similar to that of the work vehicle 100 described with reference to FIG. 1. The controller 60 includes the main ECU 3 and FC system ECU 5 as shown in FIG. 4. The controller 60 is configured or programmed to control the operation of the work vehicle 200 by issuing commands to other ECUs such as the ECU 73 in the inverter 72 and the ECU 42 in the FC module 10. Each ECU includes a storage (ROM) and may further include a processing circuit (or processor) such as an FPGA (Field Programmable Gate Array) and/or a GPU (Graphics Processing Unit). Each ECU, either independently or in cooperation with other ECUs through communication, sequentially executes computer programs stored in the storage that describe sets of instructions to executing at least one process, thus performing desired operations.

The operation terminal 400 is a terminal for users to execute operations related to the travel of the work vehicle 200 and the operation of the implement 300, and is also referred to as a Virtual Terminal (VT). The operation terminal 400 may include a touch screen display and/or one or more buttons. The display device may be a display such as a liquid crystal display or an organic light-emitting diode (OLED) display. By operating the touch screen of the operation terminal 400, users can perform various operations such as inputting information regarding the type of implement 300 and/or type of work, changing values of controlled variables for the work vehicle 200 such as vehicle speed or engine rotation speed, and switching the implement on/off by operating the touch screen of the operation terminal 400. The touch screen of the operation terminal 400 serves as both a display device and an input device. The operation terminal 400 may be configured to be detachable from the work vehicle 200. A user at a location away from the work vehicle 200 may control the operation of the work vehicle 200 by operating the detached operation terminal 400. Alternatively, input devices and display devices different from the operation terminal 400 may be used. For example, computers such as personal computers (PCs), laptop computers, tablet computers, smartphones, and other computers or peripheral devices may be used as input devices and display devices. The meters 4 and 6 shown in FIG. 4 also serve as display devices.

The work vehicle 200 may further include at least one sensor to sense the environment around the work vehicle 200, and a processor configured or programmed to process sensor data output from the at least one sensor. The sensor may include, for example, a plurality of cameras, a LiDAR sensor, and a plurality of obstacle sensors. The sensor data output from the sensor may be used for obstacle detection and positioning, for example. Various ECUs mounted on the work vehicle 200 may be configured or programmed to cooperatively perform calculations and control to achieve autonomous driving based on the sensor data output from the sensor.

In this example embodiment, the fuel tank 50 is supported by a mounting frame 120. The mounting frame 120 is fixed to the vehicle frame 102 across the driver seat 107. The fuel tank 50 is located above the driver seat 107. However, the installation location of the fuel tank 50 is not limited to the illustrated example and may be, for example, inside the front housing 110.

In this example embodiment, the mounting frame 120 is an elongated structure, such as a pipe, fixed to the vehicle frame 102. The mounting frame 120 includes two frames positioned on the left and right sides of the work vehicle 200 (refer to FIG. 5). The front portion of the mounting frame 120 has a curved shape. However, the shape of the mounting frame 120 shown is just an example, and the shape of the mounting frame 120 is not limited to this example.

In this example embodiment, the vehicle frame 102 has a front frame 102A that rotatably supports the front wheels 104F and a transmission case 102B that rotatably supports the rear wheels 104R. One end (front end) of the mounting frame 120 is fixed to the front frame 102A. The other end (rear end) of the mounting frame 120 is fixed to the transmission case 102B. These fixations may be done by appropriate methods such as welding or bolt joining, depending on the material of the mounting frame 120. The mounting frame 120 may be made of metal, synthetic resin, carbon fiber, or composite materials such as carbon fiber reinforced plastic or glass fiber reinforced plastic. The transmission case 102B includes a rear axle case, and the rear end of the mounting frame 120 may be fixed to the rear axle case. When the mounting frame 120 is made of metal, a portion or entirety of its surface may be covered with synthetic resin.

As shown in FIG. 6, the work vehicle 200 includes a cabin 105 that surrounds the driver seat 107 between the vehicle frame 102 and the mounting frame 120. The driver seat 107 is located in the rear portion of the interior of the cabin 105. In front of the driver seat 107, for example, a steering wheel 106 is provided to change the direction of the front wheels 104F. The cabin 105 includes a cabin frame that forms its skeleton. A roof 109 is provided on the upper portion of the cabin frame. The cabin frame in this example embodiment is a 4-pillar style. The cabin 105 is supported by the transmission case 102B of the vehicle frame 102, for example, via vibration-isolating mounts. The user interface 1 explained with reference to FIG. 4 is provided inside the cabin 105. Since the cabin 105 does not directly support the fuel tank 50, there is no need to specially increase its strength, and a cabin that has been used in conventional tractors can be adopted.

The work vehicle 200 includes a placement platform 51A that connects the left frame 120 and the right frame 120. The fuel tank 50 can be positioned on the placement platform 51A. When there are a plurality of fuel tanks 50, the plurality of fuel tanks 50 may be provided in a fuel tank module 55. As shown in FIG. 6, the fuel tank module 55 includes a tank case 51 that houses a plurality of fuel tanks 50. The left and right mounting frames 120 may be connected to each other by structural elements other than the placement platform 51A.

A linkage device 108 is provided at the rear end of the transmission case 102B, which defines the rear portion of the vehicle frame 102. The linkage device 108 includes, for example, a three-point linkage device (referred to as a "three-point link" or "three-point hitch"), a PTO shaft, a universal joint, and a communication cable. The implement 300 can be attached to or detached from the work vehicle 200 using the linkage device 108. The linkage device 108 can, for example, raise and lower the three-point link by a hydraulic device to change the position or posture of the implement 300. Additionally, power can be transmitted from the work vehicle 200 to the implement 300 via the universal joint. The work vehicle 200 can execute predetermined work (agricultural task) with the implement 300 while pulling the implement 300. The linkage device 108 may be provided on the front portion of the vehicle frame 102, in which case the implement 300 can be connected to the front of the work vehicle 200.

The implement 300 may include, for example, a drive device, a controller, and a communication device. The drive device performs the operations necessary for the implement 300 to execute predetermined tasks. The drive device includes devices appropriate for the application of the implement 300, such as hydraulic devices, electric motors, or pumps. The controller is configured or programmed to control the operation of the drive device. The controller causes the drive device to perform various operations in response to signals transmitted from the work vehicle 200 via the communication device. Signals corresponding to the state of the implement 300 may also be transmitted from the communication device to the work vehicle 200.

The implement 300 shown in FIG. 6 is a rotary tiller, but the implement 300 is not limited to a rotary tiller. For example, any implement such as a seeder, spreader, transplanter, mower, rake, baler, harvester, sprayer, or harrow can be connected to and used with the work vehicle 200.

The work vehicle 200 shown in FIG. 6 is capable of manned operation, but it may also be configured or programmed only for unmanned operation. In that case, components necessary only for manned operation, such as the cabin 105, steering wheel 106, and driver seat 107, may not be provided on the work vehicle 200. An unmanned work vehicle 200 can travel autonomously or by remote control by a user.

The controller 60 is configured or programmed to control the operation of the work vehicle 200. For example, the controller 60 is configured or programmed to control the power supplied from the FC module 10 to the motor 70. As shown in FIG. 4, the power that is output from the FC module 10 is supplied to the motor 70 via the inverter 72. The controller 60 may be configured or programmed to control the power supplied to the motor 70 by, for example, issuing commands to the ECU 42 to change the power generation of the FC module 10, or issuing commands to the ECU 73 of the inverter 72 to change the output power of the inverter circuit. There is a relationship between the power supplied to the motor 70 (i.e., the input power of the motor 70) and the mechanical output of the motor 70 (hereinafter referred to as "output of the motor 70" or "motor output") as follows: "input power=mechanical output+loss". Therefore, the controller 60 may be configured or programmed to control the output of the motor 70 by controlling the power supplied from the FC module 10 to the motor 70.

The controller 60 in this example embodiment is capable of operating in a plurality of control modes. The plurality of control modes include a normal mode and an output limitation mode. The output limitation mode is a mode that limits the output of the motor 70 to reduce fuel consumption or suppress temperature rise of equipment. Since fuel consumption is suppressed in the output limitation mode, this mode can also be referred to as an "eco mode." The controller 60 may be configured or programmed to switch from the normal mode to the output limitation mode, for example, when the remaining amount of fuel in the fuel tank 50 is low, or when the temperature of equipment such as the FC module 10, inverter 72, or motor 70 becomes high. In the output limitation mode, the upper limit value of the power supplied from the FC module 10 to the motor 70 and the upper limit value of the output of the motor 70 are restricted to be smaller than in the normal mode. This control can be achieved, for example, by limiting the power generation by suppressing the amount of fuel or oxidizing gas supplied to the FC stack 11, or by limiting the output power of the inverter circuit through switching control of the inverter circuit. In the output limitation mode, for example, even if the accelerator pedal is strongly pressed, the vehicle speed may not increase much.

The controller 60 in this example embodiment is configured or programmed to alter the upper limit of the power supplied to the motor 70 in the output limitation mode according to the type of implement 300 connected to the PTO shaft 76 and/or the type of work performed by the implement 300. The controller 60 may be configured or programmed to switch from the normal mode to the output limitation mode, for example, when the remaining amount of fuel in the fuel tank 50 measured by the sensor S4 shown in FIG. 4 falls below a threshold. Alternatively, the controller 60 may be configured or programmed to switch from the normal mode to the output limitation mode when the temperature of the coolant of the FC module 10 measured by the temperature sensor S3 shown in FIG. 2 exceeds a threshold (e.g., 90° C. or 100° C., or similar values). Conversely, the controller 60 may be configured or programmed to switch from the normal mode to the output limitation mode when the temperature of the FC module 10 measured by the temperature sensor S3 falls below another threshold (e.g., 0° C. or −10° C., or similar values). Furthermore, not limited to the temperature of the FC module 10, it may switch from the normal mode to the output limitation mode when the temperature measured by the temperature sensor S5 of the inverter 72 or the temperature sensor S6 of the motor 70 exceeds a threshold. Alternatively, it may switch from the normal mode to the output limitation mode when the temperature obtained from a sensor to measure the temperature of equipment or circuits other than the FC module 10, inverter 72, and motor 70 exceeds a threshold.

The types of implements include, as mentioned above, rotary tillers, seeders, or spreaders, for example. The types of work performed by the implements include tilling, seeding, or fertilizing, for example. It should be noted that the types of implements and the types of work do not necessarily correspond one-to-one. For example, if the implement type is a rotary tiller, the work types may include a plurality of types such as tilling, puddling, or ridging. Even when performing the same type of work, the workload may differ depending on the situation. For instance, even when using the same implement for similar work, the rotation speed of the PTO shaft 76 may be changed according to the condition of the work site. In such cases, the controller 60 may be configured or programmed to change the upper limit of the power supplied to the motor 70 according to the workload.

The controller 60 may be configured or programmed to, for example, obtain identification information of the implement 300 connected to the PTO shaft 76 and identify the type of implement 300 based on the identification information. The work vehicle 200 and the implement 300 may be configured to communicate in compliance with ISOBUS standards such as ISOBUS-TIM. In this manner, the controller 60 of the work vehicle 200 may be configured or programmed to obtain the identification information of the implement 300 by communicating with the implement 300. Alternatively, the controller 60 may identify the type of implement 300 connected to the PTO shaft 76 and/or the type of work performed by the implement 300 based on information about the type of implement 300 and/or type of work input by a user through an input device such as the operation terminal 400.

The sensor S4 shown in FIG. 4 acquires remaining fuel pressure data of the fuel in the fuel tank 50. The controller 60 may be configured or programmed to estimate the remaining fuel amount based on the remaining fuel pressure data output from the sensor S4. In this example embodiment, the remaining fuel amount estimated in this manner may sometimes be referred to as the remaining fuel amount measured by the sensor S4. The remaining fuel amount may be expressed as a percentage (%) of the remaining amount relative to the full tank capacity. The controller 60 may be configured or programmed to determine whether to switch from the normal mode to the output limitation mode based on the remaining fuel amount measured by the sensor S4.

The temperature sensor S3 shown in FIG. 2 measures the temperature of the coolant flowing through the coolant discharge pipe 33. The controller 60 may be configured or programmed to determine whether to switch from the normal mode to the output limitation mode based on the temperature measured by the temperature sensor S3 as the temperature of the FC module 10. For example, when the temperature measured by the temperature sensor S3 deviates from a predetermined temperature range, it may switch from the normal mode to the output limitation mode. Not limited to the temperature sensor S3 that measures the temperature of the coolant flowing through the coolant discharge pipe 33, the temperature of the FC module 10 may be measured by a temperature sensor that measures the temperature at other locations within the FC module 10. Alternatively, the temperature sensor S5 that measures the temperature of the inverter 72 or the temperature sensor S6 that measures the temperature of the motor 70 may be used. In this case, the controller 60 may be configured or programmed to determine whether to switch from the normal mode to the output limitation mode based on the measured temperature of the inverter 72 or the motor 70.

The storage 7 shown in FIG. 4 stores data that defines the correspondence between the type of implement and/or type of work, and the upper limit of power supplied from the FC module 10 to the motor 70. The controller 60 may be configured or programmed to determine the upper limit of power supplied from the FC module 10 to the motor 70 or the upper limit of motor output based on this data. This data may be, for example, a lookup table (hereinafter simply referred to as a "table") or another type of data.

FIG. 7A is a diagram showing an example of a table illustrating the relationship between the types of implements and upper limits of power supplied to the motor 70 (i.e., the input power of the motor 70). In the exemplary table shown in FIG. 7A, the implement types include five types: rotary tiller, spreader, seeder, mower, and harrow. The table lists the corresponding upper power limit for each implement type. For example, when the implement 300 attached to the work vehicle 200 is a rotary tiller, the upper limit of power supplied to the motor 70 is P1 (kW), and when the implement 300 is a spreader, the upper limit is P2 (kW). In this example, the upper limit of power supplied to the motor 70 can be set to different values depending on the type of implement 300.

FIG. 7B is a diagram showing an example of a table illustrating the relationship between the types of implements, types of work, and upper limit values of power supplied to the motor 70. In the exemplary table shown in FIG. 7B, the implement types include five types: rotary tiller, spreader, seeder, mower, and harrow, and the work types include seven types: tilling, puddling, ridging, fertilizing, seeding, mowing, and harrowing. The table lists the corresponding upper power limit for each combination of implement type and work type. For example, when the work vehicle 200 is performing tilling work while towing a rotary tiller, the upper limit of power supplied to the motor 70 is P11 (kW), and when performing fertilizing work while towing a spreader, the upper limit is P21 (kW). In this example, the upper limit of power supplied to the motor 70 can be set to different values depending on both the type of implement 300 and the type of work.

FIG. 7C is a diagram showing another example of a table illustrating the relationship between the types of implements, types of work, and upper limit values of power supplied to the motor 70. In the table shown in FIG. 7C, tilling work with a rotary tiller is classified into three levels according to the magnitude of its load. Other elements are the same as the table shown in FIG. 7B. For example, when the work vehicle 200 is performing high-load tilling work while towing a rotary tiller, the upper limit of power supplied to the motor 70 is P111 (kW), for medium-load tilling work, the upper limit is P112 (kW), and for low-load tilling work, the upper limit is P113 (kW). As in this example, the types of work may be classified into a plurality of levels according to the workload.

The controller 60 in this example embodiment is configured or programmed to determine the upper limit of power corresponding to the type of implement 300 connected to the PTO shaft 76 and/or the type of work by referring to a table such as those exemplified in FIGS. 7A to 7C. In the output limitation mode, the controller 60 is configured or programmed to limit the power supplied to the motor 70 so as not to exceed the determined upper limit of power. For example, in the case where the power is likely to exceed the upper limit when the user gives an acceleration command by operating the accelerator pedal or accelerator lever included in the operation device 2 or gives a command to increase the rotation speed of the PTO shaft 76, the controller 60 limits the power to be at or below the upper limit. This limits the motor output, thus suppressing fuel consumption and heat generation in the equipment.

During the operation of the work vehicle 200, the controller 60 may be configured or programmed to display information indicating whether the current mode is the normal mode or the output limitation mode on a display device such as the operation terminal 400. Additionally, in the output limitation mode, it may display information indicating that the motor output is actually being limited on the display device.

The work vehicle 200 includes a battery (battery pack 80 shown in FIG. 4) connected to the FC module 10 and the motor 70. In the output limitation mode, the controller 60 may be configured or programmed to determine whether or not to charge the battery, and if charging is to be performed, it may increase the power output from the FC module 10 compared to when not charging. For example, when charging, it may increase the power output from the FC module 10 by the amount of power needed for charging compared to when not charging. The controller 60 may be configured or programmed to determine whether or not to charge the battery based on at least one of the battery's state of charge (SOC) and temperature.

Figure 8:
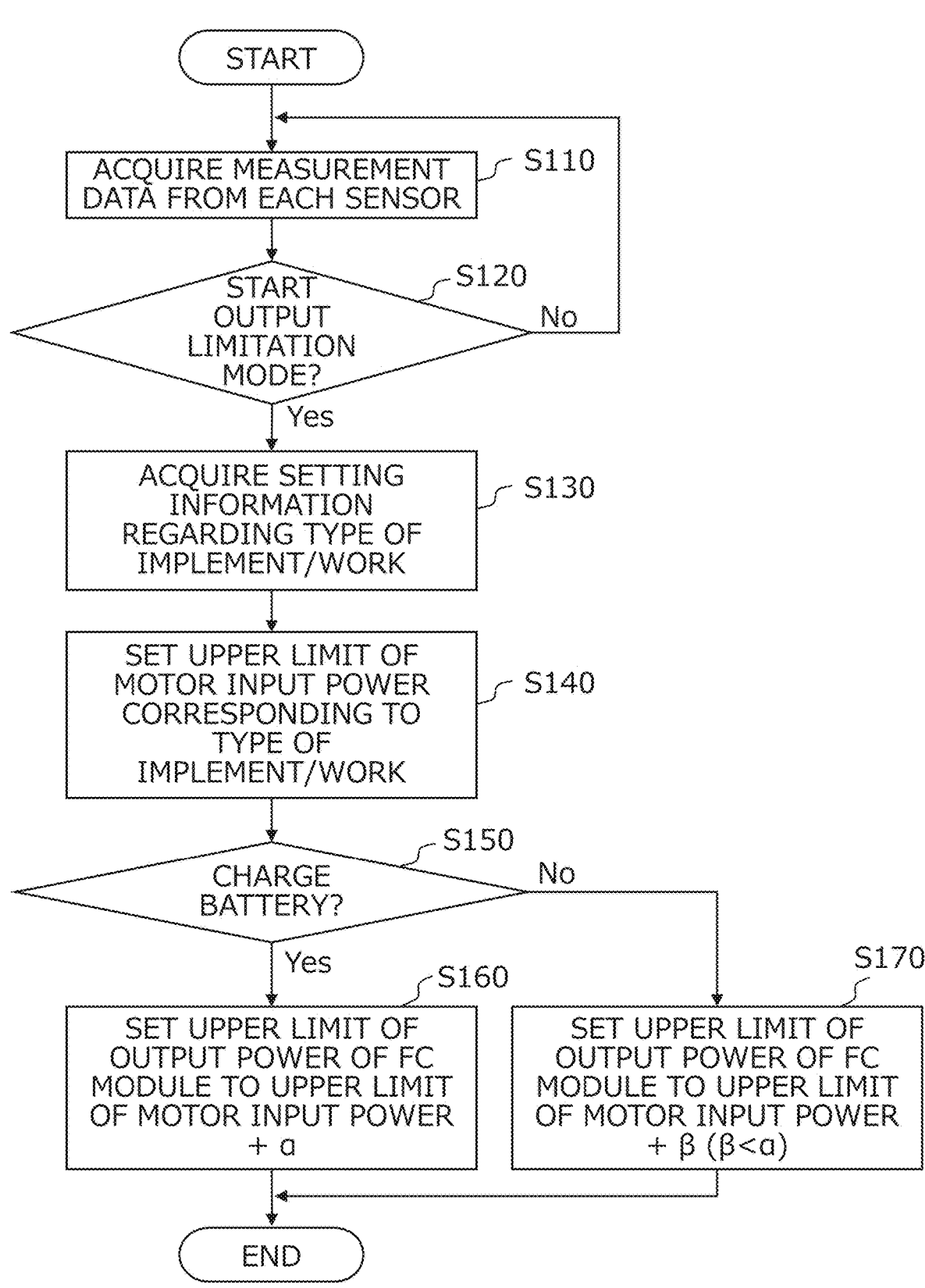
FIG. 8 is a flowchart showing an example of operations performed by the controller.

FIG. 8 is a flowchart showing an example of operations executed by the controller 60. The operations shown in FIG. 8 start when the work vehicle 200 is operating in the normal mode. In the example shown in FIG. 8, the controller 60 first acquires measurement data from each of a plurality of sensors in the work vehicle 200. For example, the controller 60 may be configured or programmed to acquire data indicating the remaining fuel amount measured by the sensor S4 of the fuel tank 50, data indicating the temperature of the FC module 10 measured by the temperature sensor S3 of the FC module 10, and data indicating the battery state of charge (SOC) and the temperature of the battery cell measured by the BMU of the battery pack 80. The controller 60 may also be configured or programmed to acquire temperature data measured by the temperature sensor S5 of the inverter 72 or the temperature sensor S6 of the motor 70.

Proceeding to step S120, the controller 60 determines whether or not to start the output limitation mode based on the acquired data. For example, the controller 60 may be configured or programmed to determine to start the output limitation mode when the remaining fuel amount measured by the sensor S4 falls below a first threshold. In the case where the sensor S4 is a pressure sensor that measures the internal pressure of the fuel tank 50, the remaining fuel amount may be determined to fall below the first threshold when the measured pressure falls below a certain threshold. In addition to or instead of the determination based on the remaining fuel amount, the controller 60 may be configured or programmed to determine to start the output limitation mode when the temperature of the FC module 10 measured by the temperature sensor S3 exceeds a second threshold. The second threshold may be set to the upper limit of the proper temperature range for the FC module 10 or a value close to it, such as 80° C., 90° C., or 100° C. The controller 60 may also be configured or programmed to determine to start the output limitation mode when the temperature of the FC module 10 measured by the temperature sensor S3 falls below a third threshold smaller than the second threshold. The third threshold may be set to the lower limit of the proper temperature range or a value close to it, such as 0° C., −10° C., or −20° C. Alternatively, the controller 60 may be configured or programmed to determine to start the output limitation mode when the temperature of the inverter 72 measured by the temperature sensor S5 or the temperature of the motor 70 measured by the temperature sensor S6 is outside their respective proper temperature ranges. When it is determined to be No in step S120, the process returns to step S110. When it is determined to be Yes in step S120, the process proceeds to step S130.

In step S130, the controller 60 acquires setting information related to the type of implement 300 and/or the type of work performed by the implement 300. The setting information may be generated based on information input by the user using the operation terminal 400 or other input devices. Alternatively, the setting information may be generated based on identification information of the implement 300 transmitted from the implement 300 to the work vehicle 200. The controller 60 can identify the type of implement 300 connected to the work vehicle 200 and/or the type of work performed by the implement 300 based on this setting information.

Proceeding to step S140, the controller 60 sets the upper limit of input power to the motor 70 corresponding to the type of implement 300 and/or type of work identified based on the setting information. For example, the controller 60 may be configured or programmed to read data from a table shown in FIGS. 7A to 7C from the storage 7, and, by referring to the data, determine the upper limit of input power to the motor 70 corresponding to the type of implement 300 attached to the work vehicle 200 and/or the type of work.

In the subsequent step S150, the controller 60 determines whether to charge the battery. Whether to charge the battery depends on the state of the battery, such as remaining capacity of the battery and/or temperature of the battery. For example, the controller 60 may be configured or programmed to determine to charge the battery when the state of charge (SOC) of the battery monitored by the BMU of the battery pack 80 shown in FIG. 4 is below a threshold (e.g., 80% or 90%) and the battery temperature monitored by the BMU is within a certain range (e.g., 0° C. to 60° C.). Conversely, the controller 60 may be configured or programmed to determine not to charge the battery when the state of charge of the battery is at or above the threshold, or when the battery temperature is outside the certain range. If the battery is to be charged, the process proceeds to step S160. If the battery is not to be charged, the process proceeds to step S170.

In step S160, the controller 60 sets the upper limit of the output power of the FC module 10 to the sum of the upper limit of the input power to the motor 70 and a predetermined value α. The value α may be set to a value correspond to the sum of the power needed to charge the battery and the power needed to drive other electrical equipment such as DC-DC converters 81 and 82.

In step S170, the controller 60 sets the upper limit of the output power of the FC module 10 to the sum of the upper limit of the input power to the motor 70 and a predetermined value β (<α). The value β may be set to the total of the power needed to drive electrical equipment other than the battery, such as DC-DC converters 81 and 82. The value β is smaller than a by the amount of power needed for charging the battery.

After step S160 or S170, the controller 60 limits the power generation of the FC module 10 so as not to exceed the upper limit of the output power of the FC module 10 that has been set. For example, even in situations where the power generation should be increased, such as when traveling while performing high-load work with the implement 300, the power generation is limited so that the output power of the FC module 10 does not exceed the upper limit. The controller 60 may be configured or programmed to control the power generation by the FC stack 11 by transmitting commands to the controller (ECU) 42 of the FC module 10 and controlling the operation of the air compressor 12, fuel circulation pump 24, coolant pump 31, and various valves. When operating in the output limitation mode, the controller 60 may be configured or programmed to display information indicating that it is in the output limitation mode on a display device such as the operation terminal 400 or meters 4 and 6.

While operating in the output limitation mode, the controller 60 repetitively acquires measurement data from each sensor and determines whether the conditions for operating in output limitation mode are met, similar to step S120. If the conditions are no longer met, the controller 60 returns from the output limitation mode to the normal mode. For example, when the temperatures measured by each temperature sensor are within the certain range and the remaining fuel amount in the fuel tank 50 is at or above the threshold, the controller 60 may be configured or programmed to return from the output limitation mode to the normal mode. Thereafter, the operations shown in FIG. 8 are executed again.

In this manner, the controller 60 in this example embodiment switches from the normal mode to the output limitation mode when predetermined conditions are met based on measurement data from one or more sensors. At that time, the controller 60 lowers the upper limit of power supplied to the motor 70 to a value corresponding to the type of implement 300 connected to the work vehicle 200 and/or the type of work. This enables switching to the output limitation mode when, for example, the remaining fuel amount is low or when the temperature of equipment such as the FC module 10 is not within the proper range, thus suppressing fuel consumption and heat generation in the equipment. Furthermore, the upper limit of the output power of the FC module 10 in the output limitation mode can be appropriately set according to the type of implement 300 and/or the type of work. Thus, fuel consumption and heat generation in the equipment can be effectively suppressed according to, for example, the magnitude of the workload of the implement 300.

When switching from the normal mode to the output limitation mode, the controller 60 may be configured or programmed to display information on a display device indicating that it is in the output limitation mode. The following describes examples of such information displays.

Figure 9:
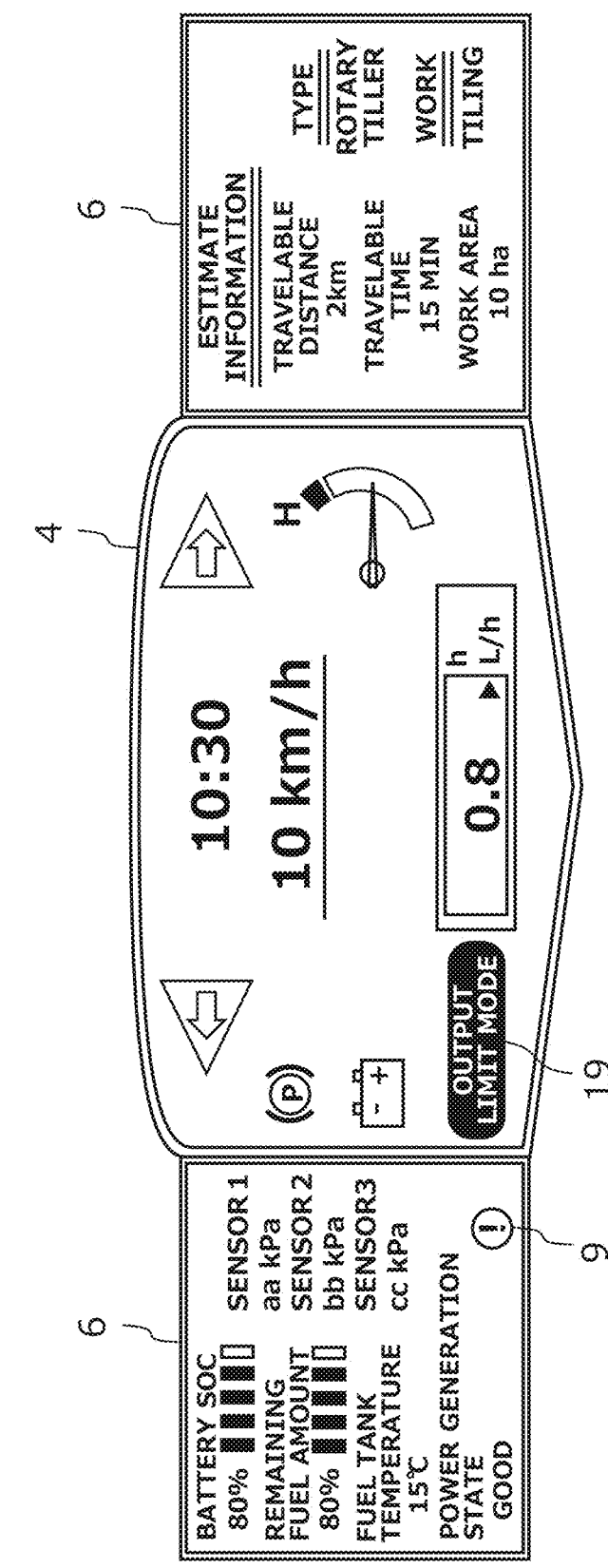
FIG. 9 is a diagram schematically showing an example of a display on a display device.

FIG. 9 is a diagram schematically showing an example of a display on a display device. The display device exemplified in FIG. 9 includes the main meter 4 and the FC meter 6. In this example, both the main meter 4 and the FC meter 6 are digital meters. However, digital meters are not necessary components. The display of the main meter 4 includes, for example, information related to the speed of the work vehicle 200, time, fuel consumption, direction indicator, parking brake lamp, charge lamp indicating abnormality in the charging system, water temperature gauge indicator showing the state of the radiator device (e.g., temperature measured by temperature sensor S3), and information 19 indicating that it is in output limitation mode.

In the example shown in FIG. 9, FC meters 6 are placed on both sides of the main meter 4. However, an FC meter 6 may be placed only on one side of the main meter 4, and the shape of each meter is not limited to the illustrated example and can be arbitrary. The FC meter 6 displays information related to the operating status of the FC power generation system 180. For example, the FC meter 6 may display predicted information estimated from the remaining fuel amount and work type. In the example shown in FIG. 9, the FC meter 6 on the right side displays predicted information of travelable distance, travelable (workable) time, and workable area. However, not all of this information needs to be displayed. For example, travelable distance and travelable time may be displayed without showing information on workable area. The FC meter 6 on the right side further displays information on the type of implement and the type of work.

The display of the FC meter 6 on the left side in the example shown in FIG. 9 includes information on the battery SOC, indicating the state of charge of the battery pack 80, the remaining fuel amount (%) in the fuel tank 50, the temperature (° C.) of the fuel tank, and the value (kPa) of the sensor S4 (pressure sensor) provided in the fuel tank 50. The display of the FC meter 6 on the left side further includes the power generation status of the FC stack 11, a warning light 9 for warning of abnormalities in the fuel tank 50, and indicators corresponding to the battery SOC and the remaining fuel amount.

Figure 10:
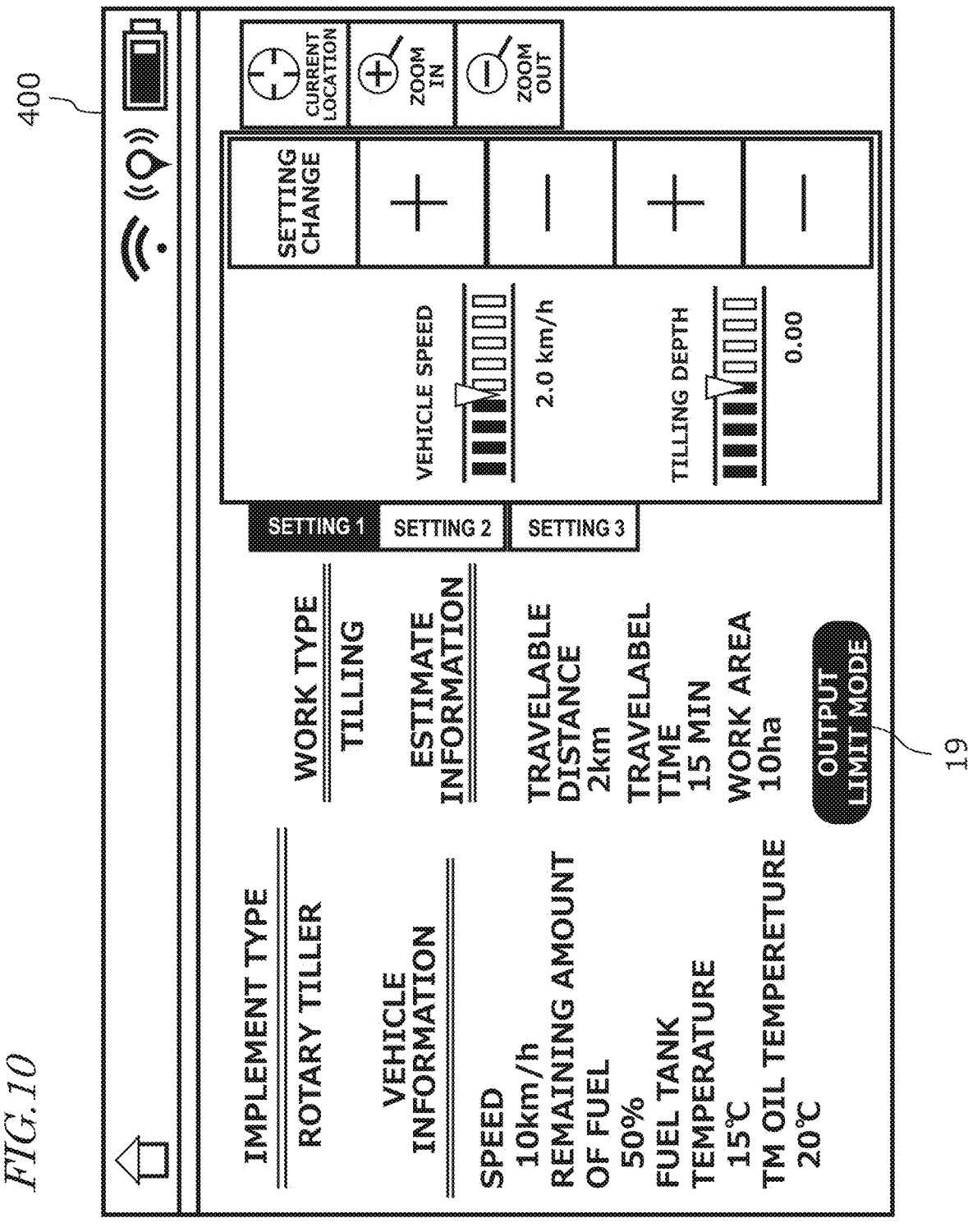
FIG. 10 is a diagram schematically showing another example of a display on a display device.

FIG. 10 is a diagram schematically showing another example of a display on a display device. The display device exemplified in FIG. 10 is an operation terminal 400. The screen of the operation terminal 400 may also display the same or similar information as that which may be displayed on the FC meter 6. The screen of the operation terminal 400 exemplified in FIG. 10 displays information 19 indicating that it is in output limitation mode, the type of implement, the type of work, and prediction information, in addition to an input interface for setting vehicle speed and plowing depth, and vehicle information.

In this manner, by presenting information indicating that it is in output limitation mode to, for example, a driver seated in the driver seat or a user utilizing the operation terminal, it may be easier to prompt the driver or user to make decisions such as refueling or stopping the operation of the implement. Furthermore, by presenting information related to the operating state of the FC power generation system to the driver or user, it may be easier to prompt the driver or user to inspect the work vehicle or FC power generation system, for example.

The controller 60 may be configured or programmed to cause an audio output device to output audio indicating that it has switched to output limitation mode, and/or audio prompting refueling. For example, the controller 60 may be configured or programmed to cause a speaker to output audio notifying that it has switched to output limitation mode, or audio prompting refueling. Alternatively, the controller 60 may be configured or programmed to cause a buzzer to output a buzzer sound indicating that it has switched to output limitation mode.

The configurations and operations of the above example embodiments are exemplary, and the present disclosure is not limited to the above example embodiments. For example, various example embodiments may be appropriately combined to configure other example embodiments.

The example embodiments and techniques in this disclosure are applicable to work vehicles such as agricultural tractors, harvesters, rice transplanters, vehicles for crop management, and vegetable transplanters.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
a fuel cell module including a fuel cell stack;
at least one fuel tank to store fuel to be supplied to the fuel cell stack;
a motor connected to the fuel cell module;
a power take-off shaft drivable by the motor and configured to connect to an implement; and
a controller configured or programmed to control electric power supplied from the fuel cell module to the motor; wherein
the controller is configured or programmed to be operable in a plurality of control modes including a normal mode and an output limitation mode in which an upper limit value of the electric power supplied from the fuel cell module to the motor is smaller than in the normal mode; and
the controller is configured or programmed to alter the upper limit value of the electric power supplied to the motor in the output limitation mode according to a type of the implement connected to the power take-off shaft and/or a type of work performed by the implement.

2. The work vehicle according to claim 1, further comprising:
a sensor to measure a remaining amount of the fuel in the fuel tank; wherein
when the measured remaining amount of the fuel falls below a threshold, the controller is configured or programmed to switch from the normal mode to the output limitation mode and lower the upper limit value of the electric power supplied to the motor to a value corresponding to the type of the implement and/or the type of work.

3. The work vehicle according to claim 1, further comprising:
a sensor to measure a temperature of the fuel cell module; wherein
when the temperature measured exceeds a threshold, the controller is configured or programmed to switch from the normal mode to the output limitation mode and lower the upper limit value of the electric power supplied to the motor to a value corresponding to the type of the implement and/or the type of work.

4. The work vehicle according to claim 1, further comprising:
an inverter connected between the fuel cell module and the motor; and
a sensor to measure a temperature of the inverter or the motor; wherein
when the temperature measured exceeds a threshold, the controller is configured or programmed to switch from the normal mode to the output limitation mode and lower the upper limit value of the electric power supplied to the motor to a value corresponding to the type of the implement and/or the type of work.

5. The work vehicle according to claim 1, further comprising:
a storage to store a table defining a correspondence relationship between the type of the implement and/or the type of work and the upper limit value of the electric power supplied to the motor; wherein
by referring to the table, the controller is configured or programmed to determine the upper limit value of the electric power corresponding to the type of the implement connected to the power take-off shaft and/or the type of work.

6. The work vehicle according to claim 1, wherein the controller is configured or programmed to obtain identification information of the implement from the implement connected to the power take-off shaft and identify the type of the implement and/or the type of work based on the identification information.

7. The work vehicle according to claim 1, wherein the controller is configured or programmed to identify the type of the implement connected to the power take-off shaft based on information related to the type of the implement and/or the type of work input by a user via an input device.

8. The work vehicle according to claim 1, further comprising:
a battery connected to the fuel cell module and the motor; wherein

24 in the output limitation mode, the controller is configured or programmed to:
determine whether or not to charge the battery; and
when charging is to be performed, increase the electric power output from the fuel cell module compared to when charging is not performed.

9. The work vehicle according to claim 8, wherein the controller is configured or programmed to determine whether or not to charge the battery based on at least one of a state of charge of the battery and a temperature of the battery.

10. The work vehicle according to claim 1, wherein the work vehicle is an agricultural machine.

11. A controller for a work vehicle that includes a power take-off shaft configured to connect to an implement and drivable by a motor connected to a fuel cell module, the controller being configured or programmed to:
operate in a plurality of control modes including a normal mode and an output limitation mode in which an upper limit value of electric power supplied from the fuel cell module to the motor is smaller than in the normal mode; and
alter the upper limit value of the electric power in the output limitation mode according to a type of the implement connected to the power take-off shaft and/or a type of work performed by the implement.

12. A control method for a work vehicle that includes a power take-off shaft connected to an implement, the power take-off shaft being drivable by a motor connected to a fuel cell module, the control method comprising:
operating in a plurality of control modes including a normal mode and an output limitation mode in which an upper limit value of electric power supplied from the fuel cell module to the motor is smaller than in the normal mode; and
altering the upper limit value of the electric power in the output limitation mode according to a type of the implement connected to the power take-off shaft and/or a type of work performed by the implement.

* * * * *